United States Patent
Carpenter, II et al.

(10) Patent No.: US 11,755,836 B1
(45) Date of Patent: Sep. 12, 2023

(54) ARTIFICIALLY INTELLIGENT ORDER PROCESSING SYSTEM

(71) Applicant: Valyant AI, Inc., Denver, CO (US)

(72) Inventors: Robley Theron Carpenter, II, Denver, CO (US); Jacob Daniel Poore, Loveland, CO (US); Benjamin William Thielker, Denver, CO (US)

(73) Assignee: Valyant AI, Inc., Denver, CO (US)

( * ) Notice: Subject to any disclaimer, the term of this patent is extended or adjusted under 35 U.S.C. 154(b) by 0 days.

(21) Appl. No.: 16/793,379

(22) Filed: Feb. 18, 2020

Related U.S. Application Data

(63) Continuation of application No. 16/274,170, filed on Feb. 12, 2019, now Pat. No. 10,592,706, which is a continuation-in-part of application No. 15/723,573, filed on Oct. 3, 2017, now Pat. No. 10,628,635.

(60) Provisional application No. 62/633,240, filed on Feb. 21, 2018, provisional application No. 62/478,454, filed on Mar. 29, 2017.

(51) Int. Cl.

| | |
|---|---|
| *G10L 15/26* | (2006.01) |
| *G06F 40/279* | (2020.01) |
| *G10L 15/18* | (2013.01) |
| *G10L 13/02* | (2013.01) |
| *G06F 16/332* | (2019.01) |
| *G10L 13/00* | (2006.01) |

(Continued)

(52) U.S. Cl.
CPC ........ *G06F 40/279* (2020.01); *G06F 16/3329* (2019.01); *G06F 40/30* (2020.01); *G06Q 30/06* (2013.01); *G10L 13/00* (2013.01); *G10L 13/02* (2013.01); *G10L 15/1815* (2013.01); *G10L 15/26* (2013.01)

(58) Field of Classification Search
CPC .. G06F 3/167; G06F 16/3329; G06F 17/2785; G10L 15/26; G06Q 20/20; G06Q 30/60
See application file for complete search history.

(56) References Cited

U.S. PATENT DOCUMENTS

| | | |
|---|---|---|
| 6,415,555 B1 | 7/2002 | Montague |
| 6,584,439 B1 | 6/2003 | Geilhufe et al. |

(Continued)

FOREIGN PATENT DOCUMENTS

| | | |
|---|---|---|
| CN | 105894405 A | 8/2016 |

*Primary Examiner* — Jakieda R Jackson
(74) *Attorney, Agent, or Firm* — Hall Estill Law Firm; Randall K. McCarthy

(57) ABSTRACT

An improved speech-based/natural language point-of-sale customer order system which is useful for any business that interacts with customers through speech or sound. Despite the advances in speech recognition, currently available voice ordering interfaces have proven to be unintuitive and lack reliability. Voice recognition has so far proven to be inefficient in retail contexts, and therefore voice recognition has so far achieved a low level of usage penetration in the retail sector. The present invention facilitates the automated operation of the ordering function of a drive-through restaurant, fast food restaurant or other business establishment by replacing an employee or other means of capturing order data with an ordering system employing a highly accurate speech recognition component that is able to be trained to recognize a wide vocabulary of words, and associate tones and other metadata in a manner not previously achieved in speech-to-text systems.

20 Claims, 6 Drawing Sheets

(51) Int. Cl.
*G06Q 30/06* (2023.01)
*G06F 40/30* (2020.01)

(56) References Cited

U.S. PATENT DOCUMENTS

| | | | | |
|---|---|---|---|---|
| 6,940,394 | B2* | 9/2005 | Gagnon | G06Q 10/10 |
| | | | | 340/286.09 |
| 6,973,437 | B1* | 12/2005 | Olewicz | G06Q 30/02 |
| | | | | 705/15 |
| 7,110,963 | B2 | 9/2006 | Negreiro | |
| 7,181,438 | B1 | 2/2007 | Szabo | |
| 7,526,466 | B2 | 4/2009 | Au | |
| 8,332,226 | B1* | 12/2012 | Rahim | G10L 15/30 |
| | | | | 704/270.1 |
| 8,552,281 | B1 | 10/2013 | Cotrone | |
| 8,798,242 | B1 | 8/2014 | Sankaranarayanan | |
| 9,153,231 | B1 | 10/2015 | Salvador | |
| 9,239,987 | B1 | 1/2016 | Tsao | |
| 9,355,155 | B1 | 5/2016 | Cassel | |
| 9,548,050 | B2 | 1/2017 | Gruber et al. | |
| 9,646,286 | B2 | 5/2017 | Brelig | |
| 10,013,980 | B2 | 7/2018 | Borsutsky et al. | |
| 10,049,663 | B2 | 8/2018 | Orr et al. | |
| 10,078,861 | B1* | 9/2018 | Clare | G06Q 30/0635 |
| 10,268,660 | B1 | 4/2019 | Arazi | |
| 10,366,442 | B1* | 7/2019 | Oczkowski | G06Q 30/0633 |
| 11,023,955 | B1* | 6/2021 | Carpenter, II | G06Q 50/12 |
| 11,100,544 | B1* | 8/2021 | Finkelstein | G06V 10/44 |
| 2002/0007315 | A1* | 1/2002 | Rose | G06Q 50/12 |
| | | | | 705/15 |
| 2002/0010584 | A1 | 1/2002 | Schultz et al. | |
| 2003/0018531 | A1 | 1/2003 | Mahaffy et al. | |
| 2003/0033222 | A1 | 2/2003 | Fuwa | |
| 2003/0041032 | A1 | 2/2003 | Ballin | |
| 2003/0167266 | A1 | 9/2003 | Saldanha | |
| 2004/0068443 | A1 | 4/2004 | Hopson | |
| 2004/0133475 | A1* | 7/2004 | Kargman | G06Q 20/20 |
| | | | | 705/16 |
| 2004/0158494 | A1* | 8/2004 | Suthar | G06Q 30/06 |
| | | | | 705/15 |
| 2004/0230496 | A1* | 11/2004 | Neuman | G06Q 20/327 |
| | | | | 705/15 |
| 2005/0065851 | A1 | 3/2005 | Aronoff | |
| 2005/0125293 | A1 | 6/2005 | Geminara | |
| 2005/0171944 | A1 | 8/2005 | Palmquist | |
| 2007/0007331 | A1 | 1/2007 | Jasper et al. | |
| 2007/0061209 | A1* | 3/2007 | Jackson | G07F 17/40 |
| | | | | 705/15 |
| 2007/0208570 | A1 | 9/2007 | Bhardwaj et al. | |
| 2007/0239565 | A1* | 10/2007 | Pentel | G06Q 20/0425 |
| | | | | 705/17 |
| 2007/0265935 | A1 | 11/2007 | Woycik | |
| 2008/0065471 | A1* | 3/2008 | Reynolds | G06Q 30/0201 |
| | | | | 705/7.32 |
| 2009/0182627 | A1 | 7/2009 | Otto | |
| 2009/0259553 | A1* | 10/2009 | Carroll | G06Q 20/20 |
| | | | | 705/15 |
| 2010/0158236 | A1 | 1/2010 | Chang | |
| 2010/0046510 | A1* | 2/2010 | Koster | H04M 11/025 |
| | | | | 370/355 |
| 2010/0106607 | A1* | 4/2010 | Riddiford | G06Q 30/0603 |
| | | | | 705/15 |
| 2010/0121808 | A1 | 5/2010 | Kuhn | |
| 2011/0283190 | A1 | 11/2011 | Poltorak | |
| 2012/0054691 | A1* | 3/2012 | Nurmi | G06F 16/951 |
| | | | | 715/854 |
| 2012/0191522 | A1 | 7/2012 | McLaughlin | |
| 2012/0295708 | A1* | 11/2012 | Hernandez-Abrego | |
| | | | | A63F 13/10 |
| | | | | 463/36 |
| 2012/0317038 | A1 | 12/2012 | Erbey | |
| 2012/0323638 | A1 | 12/2012 | Knipler | |
| 2013/0106685 | A1 | 5/2013 | Davis et al. | |
| 2013/0117135 | A1* | 5/2013 | Riddiford | G06Q 30/0641 |
| | | | | 705/15 |
| 2013/0232017 | A1 | 9/2013 | Nathanel | |
| 2013/0304457 | A1 | 11/2013 | Kang | |
| 2013/0317921 | A1 | 11/2013 | Havas | |
| 2014/0035855 | A1* | 2/2014 | Feldman | G06F 3/041 |
| | | | | 345/173 |
| 2014/0181633 | A1* | 6/2014 | Mo | G06F 16/972 |
| | | | | 715/234 |
| 2014/0310595 | A1 | 10/2014 | Acharya et al. | |
| 2014/0351068 | A1* | 11/2014 | Renfroe | G06Q 10/087 |
| | | | | 705/15 |
| 2015/0169336 | A1 | 6/2015 | Harper et al. | |
| 2016/0048583 | A1* | 2/2016 | Ontko | G06F 16/951 |
| | | | | 707/769 |
| 2016/0018928 | A1 | 6/2016 | Kurnit | |
| 2016/0284157 | A1 | 9/2016 | Marrinson et al. | |
| 2017/0083789 | A1* | 3/2017 | Shah | G06T 7/90 |
| 2017/0109843 | A1 | 4/2017 | Berg | |
| 2017/0132821 | A1* | 5/2017 | Valliani | G06F 40/169 |
| 2017/0160813 | A1 | 6/2017 | Divakaran et al. | |
| 2017/0187880 | A1* | 6/2017 | Raanani | H04M 3/5232 |
| 2017/0235404 | A1 | 8/2017 | Grivna et al. | |
| 2017/0293905 | A1 | 10/2017 | Washington et al. | |
| 2017/0324868 | A1 | 11/2017 | Tamblyn | |
| 2018/0101776 | A1 | 4/2018 | Osotio | |
| 2018/0165691 | A1 | 6/2018 | Heater | |
| 2018/0189901 | A1* | 7/2018 | Poisner | G06Q 30/0641 |
| 2018/0277107 | A1 | 9/2018 | Kim | |
| 2019/0108566 | A1 | 4/2019 | Coleman et al. | |
| 2019/0214024 | A1 | 7/2019 | Gruber | |

\* cited by examiner

ARTIFICIALLY INTELLIGENT ORDER PROCESSING SYSTEM

RELATED APPLICATIONS

This application is a continuation of U.S. patent application Ser. No. 16/274,170 filed Feb. 12, 2019 which claims priority to U.S. Provisional Application 62/633,240, filed Feb. 21, 2018 and is a continuation of U.S. application Ser. No. 15/723,573, filed Oct. 3, 2017, which claims priority to U.S. Provisional Application 62/478,454, filed Mar. 29, 2017, each of which are hereby incorporated by reference in their entirety.

FIELD OF INVENTION

This invention relates broadly to order processing systems for commercial transactions. More specifically, this invention relates to order processing systems to facilitate the ordering or selection of products or services by a customer using natural language.

BACKGROUND OF THE INVENTION

Speech recognition systems are systems that utilize a machine to identify words or phrases in spoken language and convert them into machine readable text or instructions. Early speech recognition applications included simple tasks such as voice dialing (e.g., "call home" for a phone), simple data entry (e.g., entering a credit card number or account number audibly), speech-to-text processing (e.g., word processors or emails). As speech-to-text recognition systems have become more advanced, the applications amenable to these systems has also advanced. For example, U.S. Pat. No. 9,318,108 B2 to Gruber et al. is directed to an intelligent automated assistant system that engages with the user in an integrated, conversational manner using natural language dialog, and invokes external services when appropriate to obtain information or perform various actions. Further systems have been developed whereby a device with speech recognition capabilities can control the functions of a variety of secondary devices around the home or at a commercial enterprise. For example, U.S. Pat. No. 9,698,999 B2 to Mutagi teaches systems and techniques for controlling a secondary device by natural language input using a primary speech-responsive device. The secondary device can be a device not traditionally considered "smart", such as a desk lamp, which can be turned on and off by natural language inputs to the primary speech-responsive device.

Many businesses, including banks, retail stores and restaurants rely on verbal orders from customers. Slow, inaccurate or inefficient capture of verbal orders can frustrate customers and lead to lower sales. This is especially true in fast food restaurants. Fast food restaurants, or quick serve restaurants, are restaurants that specialize in food that can be prepared and served quickly. While many of these types of restaurants have placed an increased focus on the quality of the food served, a principal focus remains serving the customer quickly and accurately for the convenience of the customer. The process begins when the customer engages the restaurant's order processing system, be that an employee taking an order or, more recently, interacting with a touch screen system or other touch-activated physical interface to make order selections. Streamlining the order processing system can dramatically enhance the speed of the over-all process and enhance customer satisfaction, while driving down labor-associated expenditures.

Depending on the level of customer traffic, a delay can often result when the restaurant employees are busy fulfilling other service tasks, such as collecting payment and delivering food. This delay can be significantly frustrating to customers wishing to place an order. In addition, significant amounts of time can be devoted to receiving orders by restaurant employees, which can limit their productivity in other areas of their job function. Moreover, the intense time demands on restaurant workers can lead to less pleasant interactions with customers, which can be critically impact the first impression that is created with the ordering process. And the time constraints may lead to missed opportunities for additional sales, such as through the recommendation of complimentary or new products that are available for purchase.

Attempts have been made to develop speech-based natural language ordering systems. These systems have numerous limitations that have reduced their acceptance by customers. For example, these systems have had a limited vocabulary and are poor at recognizing words spoken at different speeds or with accents in a manner analogous to that of human capability. They are also poor at recognizing tone, such as tone that could detect growing frustration with the process requiring human intervention. Moreover, these systems often fail to make key associations between products ordered and miss the opportunity to sell or 'up-sell' additional items. This can lead to an unwillingness to adopt a system due to concerns over lost revenue opportunities. The present invention overcomes these short-comings as will become apparent in the foregoing description of the artificially-intelligent, natural language order processing system as taught herein.

SUMMARY OF THE INVENTION

The preferred embodiment of the invention consists of an artificially intelligent order processing system. Alternative embodiments of the invention comprise methods of deployment of the artificially intelligent order processing system. The present inventor has discovered that when configured as described herein, the artificially intelligent order processing system is useful for any business that interacts with customers through speech or sound.

In an embodiment, the present invention comprises a method of training a natural language ordering system. The method comprises the steps of (1) providing an audio stream of customer ordering transactions; (2) slicing the audio stream into short clips (also variously referred to herein as "audio clips"); (3) transcribing the short clips into text using a transcription unit; (4) adding metadata tags to the transcribed text using the transcription unit; (5) training an artificial intelligence network by populating the network with the transcribed text having the metadata tags. The short clips optionally comprise of sentences, phrases, time-limited clips (e.g. 2 seconds, 3 seconds, 4 seconds, 5 seconds, 6 seconds, 8 seconds, 10 seconds, or 15 seconds). In an embodiment, the method further includes the steps of scanning the short clips for a set of predefined parameters or words and providing the short clips having predetermined parameters or words to a transcription unit for transcribing. By keeping certain clips and discarding other clips, the present inventor has discovered that when configured as described herein, the artificially intelligent order processing system avoids overloading the transcription unit. In an embodiment, the transcription unit consists of a crowd source platform. The present inventor has discovered that in the context of invention, crowd source platforms allow for incorporation human perception and transcription of the short clips, without requiring a dedicated staff to review the short clips. In an embodiment, the step of transcribing the short clips in the training phase is performed by a human. The present inventor has discovered that human transcription at the training stage enhances the fidelity of the recognition in later stages. Metadata tags are optionally added during transcription in embodiments. The metadata tags optionally include data on tone or inflection. The present inventor has noted that aspects such as tone or inflection are often difficult to accurately capture and recognize, especially initially, using previously existing speech-to-text processors. In an alternative embodiment, a speech-to-text processor as well known to those skilled in the art is utilized to achieve transcription.

In an embodiment, the method further comprises the steps of (1) identifying a word or phrase in the text, such as by using the speech-to-text processor, and providing meaning for the identified word or phrase using a natural language processor. In this manner, the artificially intelligent order processing system optionally attributes meaning from the audio clip to be used to assemble an order. Following attribution of meaning from the words or phrases by the artificially intelligent order processing system, an order can be generated with a business processor using the identified word or phrase from the natural language processor. In addition, the natural language processor is configured or trained in an embodiment to trigger an alert when a warning condition is encountered. Warning conditions optionally comprise utterances such as a word or phrase indicative of customer dissatisfaction or confusion. In an advantageous embodiment, the audio stream used for text transcription is a stream from a customer accessible microphone to a base station, which can then be transmitted to one or more headsets. The method in an embodiment further comprises the step of decreasing the strength of the audio stream prior to transmission to the transcription unit.

In another embodiment, the invention comprises a method of speech recognition-based order processing. The method comprises the steps of (1) providing an audio stream of a customer order; (2) providing an order processor having a speech recognition module trained using artificial intelligence programs; (3) converting a word or words in the audio stream to text using the speech recognition module; (4) processing the text communication with the speech recognition module to identify a word or words in the text of the converted audio stream according to a previous spoken word training; (5) providing a natural language processor having order assembly capabilities and exception detection capabilities, wherein the natural language processor receives recognized text from the order processor and creates or modifies an order based upon the recognized text; (6) generating an order with the natural language processor; (7) alerting an auditor of detected exceptions in the order; and (8) transmitting the order to a business processor, wherein the business processor communicates with a point-of-sale system to collect payment and provide notifications to release the ordered product or service. In an advantageous embodiment, the order is processed in real time. In further advantageous embodiments the business processor will receive order information from the NLP and perform the steps of associating the order items with one or more additional menu items or options associated with the order items and querying the customer about the one or more additional menu items or options associated with the order items. The NLP can then update the order based upon the customer response to the query. In this manner, upselling activity can be performed by the artificially intelligent order processing system to generate additional sales to maximize the revenue stream. In addition, the present inventor has noted that in a configuration as described herein, customer satisfaction is increased if the artificially intelligent order processing system is configured to identify typical preferences of a customer. For example, if the customer is ordering a hamburger, the customer might have a preference for how the burger is cooked (e.g. medium or well-done; mustard or no mustard). In addition, if the artificially intelligent order processing system is able to identify the customer, the artificially intelligent order processing system optionally queries the customer based upon past preferences (e.g. hold the onions on the burger or no ice in the drink). It is a further teaching of an embodiment that alert instances or conditions are defined in the artificially intelligent order processing system such that when the alert condition arises an alert to the auditor prompts the auditor to take control of the order processing system or to perform some other corrective action. Lastly, the method as described in this paragraph further comprises the steps of (1) reviewing an order by an auditor by comparing the order generated by the natural language processor to the communication in the audio stream and (2) updating the order based upon auditor review.

In another alternative embodiment, the invention comprises a second method of speech recognition-based order processing. The method comprises the steps of (1) providing an audio stream of a customer order to a speech-to text processor; (2) providing an order processor having a speech recognition module trained using artificial intelligence programs; (3) converting a word or words in the audio stream to text using the speech recognition module; (4) processing the text communication with the speech recognition module to identify a word or words in the text of the converted audio stream according to a previous spoken word training; (5) providing a natural language processor having order assembly capabilities and exception detection capabilities, wherein the natural language processor receives recognized text from the order processor and creates or modifies the order based upon the recognized text; (6) generating an order with the natural language processor; (7) providing an audio stream of a customer order to an auditor; (8) providing the generated order to the auditor; (9) performing a comparison of the audio stream of a customer order with the generated order by the auditor; (10) updating the order processor based upon errors detected in the order by the auditor; and (11) transmitting the order to a business processor, wherein the business processor communicates with a point-of-sale system to collect payment and provide notifications to release the ordered product or service. In an advantageous embodiment of the artificially intelligent order processing system the business processor is configured to receive order information from the NLP and perform the steps of (1) associating the order items with one or more additional order items or options associated with the order items and (2) querying the customer about the one or more additional order items or options associated with the order items. The NLP optionally then updates the order based upon the customer response to the query. In an embodiment, a text-to-speech processor is configured to convert queries from the business processor into audio to be communicated to a customer and process the text with the text-to-speech processor to create an audio communication of the query generated by the business processor. In this manner, queries generated by the business processor are utilized to communicate with the customer in association with context-relevant communications mechanisms well understood by those skilled in the art.

BRIEF DESCRIPTION OF THE DRAWINGS

For a fuller understanding of the invention, reference should be made to the following detailed description, taken in connection with the accompanying drawings, in which.

DETAILED DESCRIPTION

Figure 1:
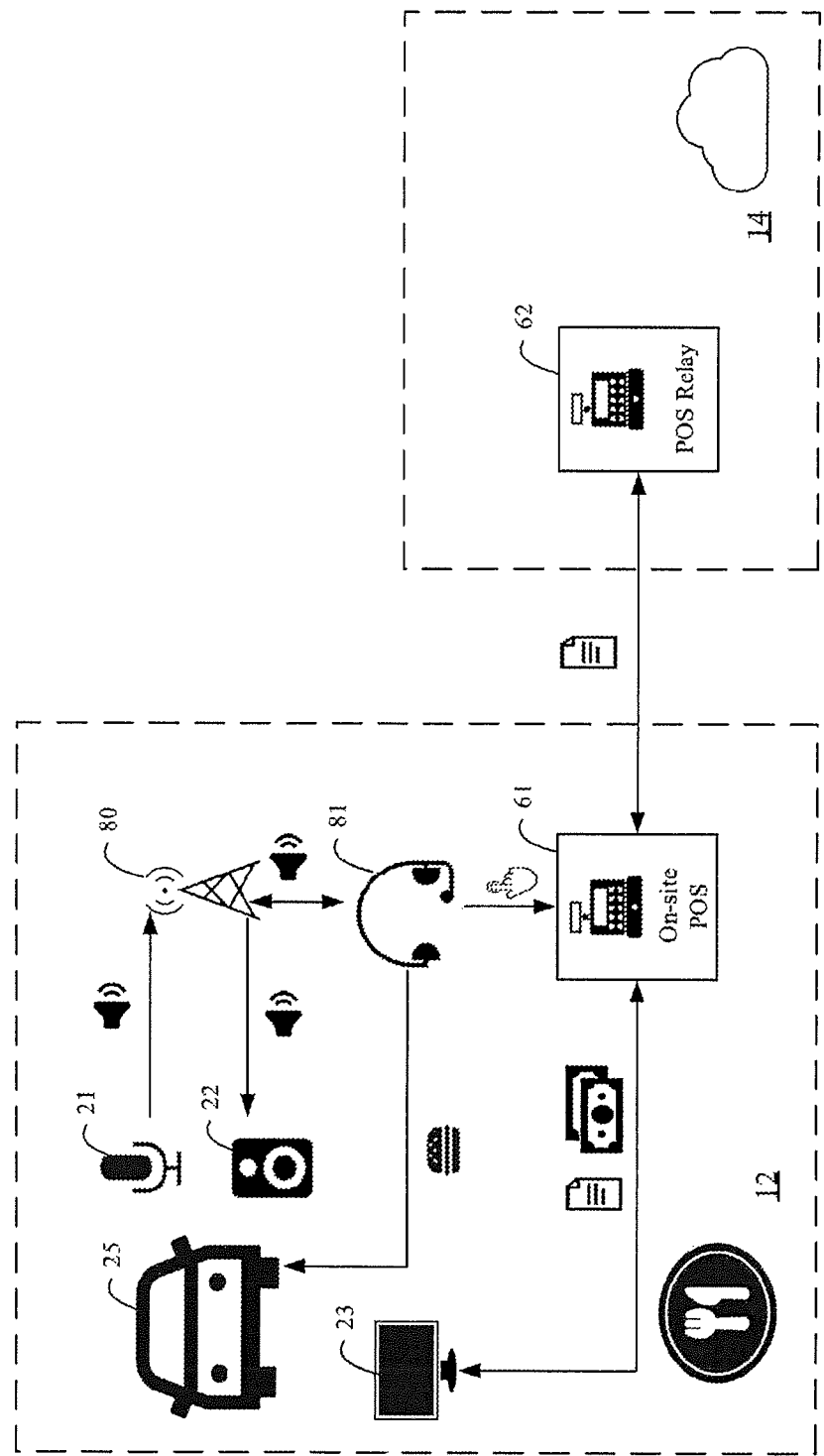
FIG. 1 is a diagram depicting an order system under the control of an on-site employee.

The preferred embodiment of the invention provides an improved speech-based, natural language point-of-sale customer order station which is useful for any business that interacts with customers through speech or sound. To aid in the understanding of the preferred embodiment, it will be described in this patent application in the context of a drive-through restaurant. The preferred embodiment facilitates the automated operation of the ordering function of a drive-through restaurant, fast food restaurant or other business establishment by replacing an employee or other means of capturing order data with an ordering system employing a highly accurate speech recognition component that is able to be trained to recognize a wide vocabulary of words, and associate tones and other metadata in a manner not previously achieved in speech-to-text systems.

In the exemplary embodiments presented herein, the artificially intelligent order processing system is configured to facilitate customer interactions. A customer interacts with a system according to embodiments through a microphone at an order station where the microphone transmits the audio signal to be processed for order processing. However, it is envisioned that that the artificially intelligent order processing system is otherwise configured to facilitate customer communication through variety of electronic audio communication means, including via telephone.

Embodiments of the invention comprise an order station. In an embodiment, the order station comprises an order panel with a microphone component and a speaker component. The artificially intelligent order processing system in an embodiment is configured to be either voice or speech activated and optionally incorporates a video display, a touch screen and one or more components to facilitate payment in association with mechanisms well-understood by those skilled in the art. In an embodiment, the video display is used to display menu items (or other items for purchase or selection), to display a running list of items ordered, prices and totals, and order status (e.g., wait time, availability of items).

In an embodiment, the order station further comprises a menu display. The menu display is configured to communicate either via video as discussed above, or in fixed form, which, based upon current technology, is preferably a menu display screen, for displaying, on one or more screens, a complete listing of all available menu items and options with their respective prices and other menu item information as desired. If a touch screen and payment components are used they will preferably be positioned to be reached through the driver's window by a person seated in the driver's seat of the customer vehicle. Alternatively, if the order station is a walk-up kiosk, such as inside a restaurant, the touch screen and payment components will preferably be positioned to be reached by a customer in a standing position. Alternatively, a customer smart phone could be used as the interface in lieu of the order station.

The artificially intelligent natural language order processing system in alternative embodiments is configured to incorporate multiple modes. In various embodiments, the order system is configured to operate either in one mode or a plurality of modes depending upon the installation and desired application. In the preferred embodiment, the intended modes can broadly be categorized as (i) a training mode, (ii) an auditor-assist mode and (iii) an autonomous mode.

In various embodiments, the artificially intelligent order processing system comprises an auditor. In an exemplary configuration, the auditor is employed to ensure the proper functioning of the artificially intelligent order processing system after training. In an embodiment, the auditor is physically located off-site from the remainder of the artificially intelligent order processing system. The auditor is optionally configured or otherwise directed to review the order to detect errors or faults, such as by comparing the processed order in real time to the audio stream, and override the other aspects or outputs of the artificially intelligent order processing system as appropriate. More specifically, the auditor in an embodiment is configured to (1) review a summary of the current order; (2) see a text of all requests made by the customer; (3) view the most recent request (e.g., "Please add fries."), and the associated response by the natural language processor (e.g., add 1 fry to order); and (4) approve an intent, or edit, if it is not correct (e.g., The customer said "add one fry" but the artificially intelligent order processing system heard "add two fries"). In an embodiment, the auditor is configured to have the capability to switch between modes or switch the artificially intelligent order processing system off to pass control to on-site employee(s). An administrator (e.g., a manager, etc.) or auditor may switch the order system between the modes based on, for example, staffing levels, time of day, and/or customer traffic, etc.

In an embodiment, the artificially intelligent order processing system is configured to have the capability to operate in a training mode. In the training mode (a) an on-site or call center employee listens to the customer's speech via a microphonic transmission means and keys order items into a POS system, while (b) the audio stream is pushed to a transcription unit where the audio is converted to text and metadata tags are added to the text to add context to the converted text. In an advantageous embodiment the transcription unit is a crowd-sourced platform. As referred to herein, crowdsourcing is a process through which a task, problem or project is solved and completed through a participants that may be geographically dispersed. The artificially intelligent order processing system is configured to empower participants to listen to audio clips, segments or slices of the audio feed deriving from other aspects of the artificially intelligent order processing system, convert the audio to text and add metadata tags to enhance the context of the converted text, in an embodiment by leveraging communication and network technologies as well understood by those skilled in the art. It is envisioned that one person or participant could listen to a given clip, or a plurality of participants could listen and transcribe the same clip depending upon the desired fidelity sought. For example, three persons (or 5, 7, 9, or more) could transcribe the text and add metatags, with the consensus transcription passed to the next step or stage. The audio and converted text with tags is then used to (a) train an algorithm that can correctly transcribe audio files into text and (b) train an algorithm that can pull meaning from transcribed text (ex. Add one fry to order), both taking advantage of artificial intelligence applications (e.g., a deep neural network) to enhance the fidelity of conversion to text and pulling meaning from the customer requests.

In the auditor-assist mode the on-site employee is removed from the traditional order processing functions and serves only as a back-up to take over the artificially intelligent order processing system upon the incidence of an error or when the artificially intelligent order processing system is switched off by an administrator or auditor. The audio stream (also variously referred to as the "audio feed") is passed from the on-site computer to both (1) a speech-to-text processor and (2) to the auditor. One part of the audio stream is transmitted to a speech-to-text converter where the audio converted to text using a speech-to-text processor (e.g., Dragon Dictation) for later processing into an order by a natural language processor. Once the order is processed by the NLP an order summary, with instruction sets, is passed to the auditor for review. The other branch of the audio stream is transmitted, as audio, to the auditor. In early stages of system implementation, one auditor could service text from one audio stream or one business site. The auditor could compare the audio stream, either in real-time or with a slight delay, to the transcript of the order as generated by a natural language processor. In addition, rather than auditing each order, the auditor could sample the orders, thereby only looking at a subset of orders or orders meeting certain parameters. Furthermore, the auditor could audit the orders only when a trigger condition presents or the auditor could simply function to safeguard the artificially intelligent order processing system and pass control of the artificially intelligent order processing system back to the on-site employee when an error situation arises. As the artificially intelligent order processing system fidelity increases, the auditor is spread over multiple business locations or customer ordering portals, thereby facilitating a decrease in the number of auditors. An embodiment of the invention is configured such that a single auditor could service a single customer or customer portal, multiple customer portals at a single business site, three business sites, five business sites, ten business sites, or twenty or more business sites depending upon the fidelity of the artificially intelligent order processing system and the relative traffic level of the business site.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In various embodiments, functionality for implementing the techniques of the present invention can be distributed among any number of client and/or server components. For example, in embodiments, various modules are implemented for performing various functions in connection with the present invention, and such modules can be variously implemented to run on server and/or client components.

According to various embodiments, the order processing system may include a plurality of different types of components, devices, modules, processes, systems, and the like, which, for example, may be implemented and/or instantiated via the use of hardware and/or combinations of hardware and software.

In the auditor-assist mode the transcription of the audio by the speech transcription unit is eliminated and the artificially intelligent order processing system operates with auditor overview of the order processing system. Errors in an order detected by the auditor can be fixed and fed back into the speech-to-text and natural language processor system to increase system fidelity and ensure that errors do not propagate or multiply through the artificially intelligent order processing system. It is further contemplated that the auditor can take-over the order processing system and switch off or override the order processing by communicating electronically with the customer and inputting order items and other key data into the POS system in the event of an error detected in the artificially intelligent order processing system or at the detection of customer dissatisfaction with the order processing system. The present inventor has noted that this feature is particularly useful when there may not be sufficient on-site staff at a restaurant deploying the artificially intelligent order processing system.

In the autonomous mode the artificially intelligent order processing system functions automatically without oversight by an auditor. The artificially intelligent order processing system can employ error detection systems to detect deviations in orders or customer dissatisfaction. Such conditions can result in the artificially intelligent order processing system switching back to an auditor-assist mode or control of the order processing function passing back to the on-site employee.

Turning to the figures, FIG. 1 is an illustration of a scenario at a drive-through restaurant 12 utilizing an order processing system where an on-site employee takes orders, receives payment and delivers food to customers. Such a system can be employed as a back-up where human intervention is required when the order-processing system according to aspects of the invention experiences a fault and needs to pass control of the artificially intelligent order processing system to an on-site employee.

In an embodiment of the invention, the artificially intelligent order processing system is configured such that the arrival of a customer 25 at an order station triggers an alert to an employee 81 or the customer 25 may make their presence known by speaking into a microphone 21. A transaction is initiated when a speaker integrated into the artificially intelligent order processing system 22 plays an audio greeting to a customer 25 to alert the customer 25 that he has been recognized by the artificially intelligent order processing system as having arrived at the ordering station. The audio greeting can be as simple as on-site employee 81 saying "Hello. May I take your order?" Alternatively, a pre-recorded message can be played by speaker 22 to let the customer 25 know that the on-site employee 81 will be with the customer shortly. Customer 25 then speaks into microphone 21 to request menu items or ask questions. The audio is passed from speaker 21 to a base station 80 within the restaurant. The base station 80 then wirelessly transmits the audio to a headset worn by employee 81. The headset worn by the employee will typically have one or two earphones to transmit the audio input from the customer 25 to the on-site employee 81 and a microphone to enable the on-site employee 81 to communicate in return with the customer 25. Speech emanating from the onsite employee 81 will enter the microphone on the headset to be transmitted to the customer using the speaker 22 at the order station. The on-site employee 81 will then manually key in the order into the on-site point of sale (POS) system 61. The on-site POS system 61 then transmits the order to a terminal 23 having a screen at the order station for viewing and confirmation by the customer 25. Alternatively, the onsite employee 81 reads the order back to the customer 25 for confirmation. The customer 25 then pays for the order using terminal 23 (e.g. by swiping a credit card) or the customer 25 submits payment directly to on-site employee 81. Alternatively, if payment is made directly from the customer 25 to on-site employee 81, then the on-site employee 81 must key payment into the on-site POS system 61. Payment made through terminal 23 will pass automatically to the on-site POS system 61. The on-site POS system 61 then associates payment with an order and generates a status indicator that payment has been received so that on-site employee 81 may fulfill the order by delivering the ordered food to the customer 25. Food delivery to the customer will typically occur at a food delivery station, and not the order station, to facilitate the flow of customers through the artificially intelligent order processing system. In an embodiment, the artificially intelligent order processing system is configured such that the on-site POS system 61 is linked to a POS Relay 62 to keep track of revenue, inventory and the like.

Figure 2:
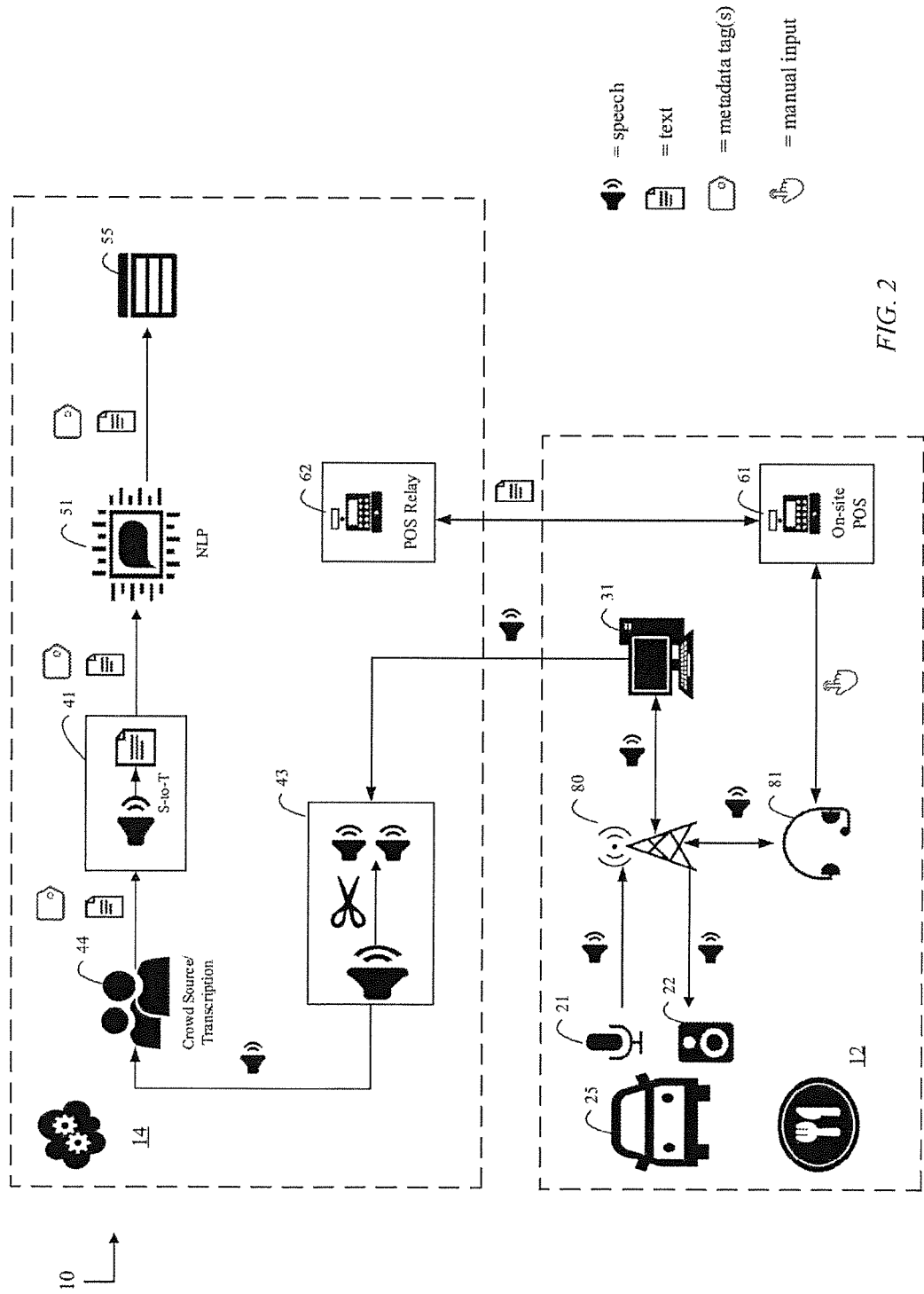
FIG. 2 is a diagram depicting the initial training of an artificially intelligent order processing system implemented in a drive through restaurant where an on-site employee processes orders and a cloud-based crowd-sourcing platform transcribes the audio into text and add metadata tags. The transcribed text then populates an artificial intelligence component and the resulting output is stored for future access.

FIG. 2 is a diagram depicting the components and the flow of data in an order processing system 10 according to aspects of an embodiment of the invention. In the artificially intelligent order processing system according to FIG. 2 the artificially intelligent order processing system is in training mode and the on-site employee 81 is responsible for taking orders, taking payment, and delivering food to a customer 25. However, in an embodiment, the artificially intelligent order processing system is configured the audio feed from order station microphone 21 to train the artificially intelligent order processing system 10 for future implementation and substitution of the on-site employee 81 in the order function. Accordingly, an on-site computer 31 is added to the artificially intelligent order processing system in an embodiment as depicted in FIG. 1. The on-site computer 31 is placed in the audio stream after the base station 80 to enable the artificially intelligent order processing system 10 to "listen" to audio communications occurring between a customer and an employee in that specific business (e.g. McDonalds™, Chik-Fil-A™ or Bank of America) or business segment (e.g. drive-through restaurant, drive-up bank, pick-up window at a drug store, or payment gate for a parking lot), thus facilitating the training of a deep neural network (DNN) system (e.g. DNN).

The on-site computer 31 will have an audio input component for receiving the audio generated from an order station microphone 21. The amplified signal from the order station microphone 21 is typically about 10 W. This amplified signal needs to be stepped down for the artificially intelligent order processing system 10 to listen to the audio communication from the customer through the microphone 21 to the base station 80. The impedance of the two systems needs to be matched so the audio can be properly passed to the onsite computer 31, so an attenuator is used to normalize the two systems. The attenuator is capable of being adjusted to address the scenario where the output from the restaurant communication system is higher or lower than expected. This facilitates the adjustment of the incoming volume to the on-site computer 31. The onsite computer 31 is also capable of adjusting the gain to increase the volume for the input. An USB to GPIO interface, configured using software, is utilized for both input and output to the on-site computer 31. In further implementations of the artificially intelligent order processing system, such as where audio is transmitted from the cloud, back through the on-site computer 31 and to speaker 22, the audio signal will require amplification as it leaves the on-site computer 31.

In an embodiment, the audio stream starting at order station microphone 21 is transmitted to the base station 80. If the computer 31 is switched "off" then the audio stream will be transmitted only to the on-site employee 81. If the on-site computer 31 is switched "on" then the audio stream will both be (1) transmitted to the on-site employee 81 and (2) pushed up to the cloud. The artificially intelligent order processing system is optionally configured to be switched on or off remotely or at the on-site location depending upon the needs of the business and the artificially intelligent order processing system performing the training.

Following transmission to the cloud, a first step in processing the audio feed can be slicing the feed into component transcribed text or audio clips 43. If a sliced clip meets certain parameters, the audio clip can be passed to the transcription unit 44, such as a crowd source platform. If the audio clip does not meet specific parameters, then the audio clip can be discarded. So, for instance, if the artificially intelligent order processing system is engaged in training to serve a fast food restaurant specializing in hamburgers, the artificially intelligent order processing system is optionally configured to produce an audio stream stating: "Wow! There are so many items to choose from. But it looks like breakfast is over? [pause] I want a cheeseburger." The artificially intelligent order processing system optionally parse the audio stream into three components or audio clips, such as, for example: (1) "Wow! There are so many items to choose from."; (2) "But it looks like breakfast is over?"; and (3) "I want a cheeseburger.". The first two audio clips optionally are provided outside the set parameters and discarded, while the third audio clip of "I want a cheeseburger." meets the parameters and is passed for transcription by a transcription unit 44 for conversion from speech to text, such as by the crowd source platform. In an embodiment of the invention, by setting parameters and discarding clips outside of the parameters, the artificially intelligent order processing system is configured to prevent the transcription unit 44 from transcribing superfluous audio.

The selected audio clip is passed to the transcription unit 44 where the audio is converted to text. The transcription unit can be a crowd source platform where individuals listen to the audio clip and manually convert the audio to text in the form of a "transcribed clip." In addition, metadata tags are optionally added to the transcribed clip text to provide additional context for the audio clip. For example, frustration levels in the customers voice, the approximate age of the customer, the approximate gender of the customer and the approximate demographics of the customer. A metatag is optionally associated with the transcribed text and audio clip, optionally by participants in the crowd source platform, when transcribed that would include this metadata gleaned from the audio clip. In this manner, the artificially intelligent order processing system is configured to utilize the crowd source platform to sanitize and validate the data. In a specific configuration, the artificially intelligent order processing system utilizes humans to transcribe the audio clips in the initial or training phase to increase the fidelity of the artificially intelligent order processing system over that achieved when the artificially intelligent order processing system is configured to utilize machine-based speech-to-text processors.

The audio, text, and metadata from the audio clips are then transmitted from the transcription unit 44 to a Deep Neural Network (DNN), where they are used to develop a Speech-to-Text System 41. Such transmission is intended to provide the ability to approximately detect frustration levels, age, gender and demographics of future customers. The DNN receives the audio, text and metadata and runs specific training programs on each of these items. The artificially intelligent order processing system in an embodiment is configured to utilize the audio to build a pattern recognition program constituting a speech-to-text module. Thus, when the artificially intelligent order processing system or speech-to-text module element encounters an audio clip in a live environment, the artificially intelligent order processing system or speech-to-text module element can quickly relate the audio clip to other audio clips encountered during training, and then cross-reference the accompanying text with those audio clips. In this manner, the speech-to-text converter infers the text from the audio based on comparison of the new live audio with the past training audio.

A Speech-to-Text System 41 will be able to take subsequent clips or audio streams from a customer and associate them with prior patterns to determine whether the utterance resulting in the audio conforms to a set of words, instructions, questions, etc. thereby identifying the spoken words that were transmitted.

In embodiments of the invention, artificial intelligence, such as that developed within the DNN in accordance with the mechanisms described herein, is leveraged to enhance the recognition of words or phrases. In a similar fashion, machine learning is intimately connected into the artificial intelligence. In embodiments of the invention, as the artificial intelligence begins to build a database of information about customers, their preferences, common questions, and requests, the artificially intelligent order processing system builds upon its existing knowledge base in order to provide new and unique ways of responding to future users who have similar requests and needs. Users are also able to enhance the internal machine learning capabilities of the artificially intelligent order processing system through voice and text inputs to expand the artificially intelligent order processing systems knowledge base in accordance with teachings of the invention.

Embodiments of the invention incorporate speech-based training algorithms. Such speech-based training algorithms involve the process of using spoken language to provide feedback to an artificially intelligent software application. This feedback in an embodiments is used in a configuration of the artificially intelligent order processing system to modify the responses the artificial intelligence program would give responsive to a customer request or order item.

An embodiment of the artificially intelligent order processing system is configured such that the transcribed text from the audio clips are then transmitted from the Speech-to-Text System 41 to a Natural Language Processor 51, also employing a Deep Neural Network, where meaning is pulled from, or assigned to, the speech following its recognition by the Speech-to-Text System 41. In the initial training stage the audio, text, and metadata from the clips are transmitted from the Natural Language Processor 51 to a storage device 55 for future access. In an embodiment, storing data facilitates tasks including re-testing the artificially intelligent order processing system, such as in instances where the artificially intelligent order processing system encounters difficulty in the identification of certain, words, phrases or tones.

Referring back to the order station, in certain embodiments the order panel comprises an automated, self-service payment acceptor. The payment acceptor optionally comprises a magnetic strip card reader or chip reader (e.g., employing the EMV standard) for credit cards, debit cards, EBT cards and other types of widely used cards which utilize a magnetic strip or chip. In an embodiment, the payment acceptor further comprises mobile payment options like Android or Apple Pay. Additionally, the payment acceptor is optionally configured to utilize distinguishing factors of a user, such as distinguishing factors derived from facial recognition, to connect a user with a stored payment account for automatically making payment after the order has been placed.

In an embodiment, the artificially intelligent order processing system is configured to communicatively connect with a restaurant such that if the customer 25 has a mobile payment account setup with the restaurant, the receipt for the order is sent to the customer's device as a record of their transaction.

The training system in an embodiment is configured to capture the language necessary to operate the artificially intelligent order processing system and associate the language with menu items and requests for service as required to apply in a drive-up restaurant environment. In the training phase the artificially intelligent order processing system will generally not be operable to process orders, but will piggyback on the work of employees performing restaurant functions including audibly capturing order instructions, converting those audible instructions to input data for the point of sale system, and confirming that an order has been captured correctly for further preparation and payment collection.

Figure 3:
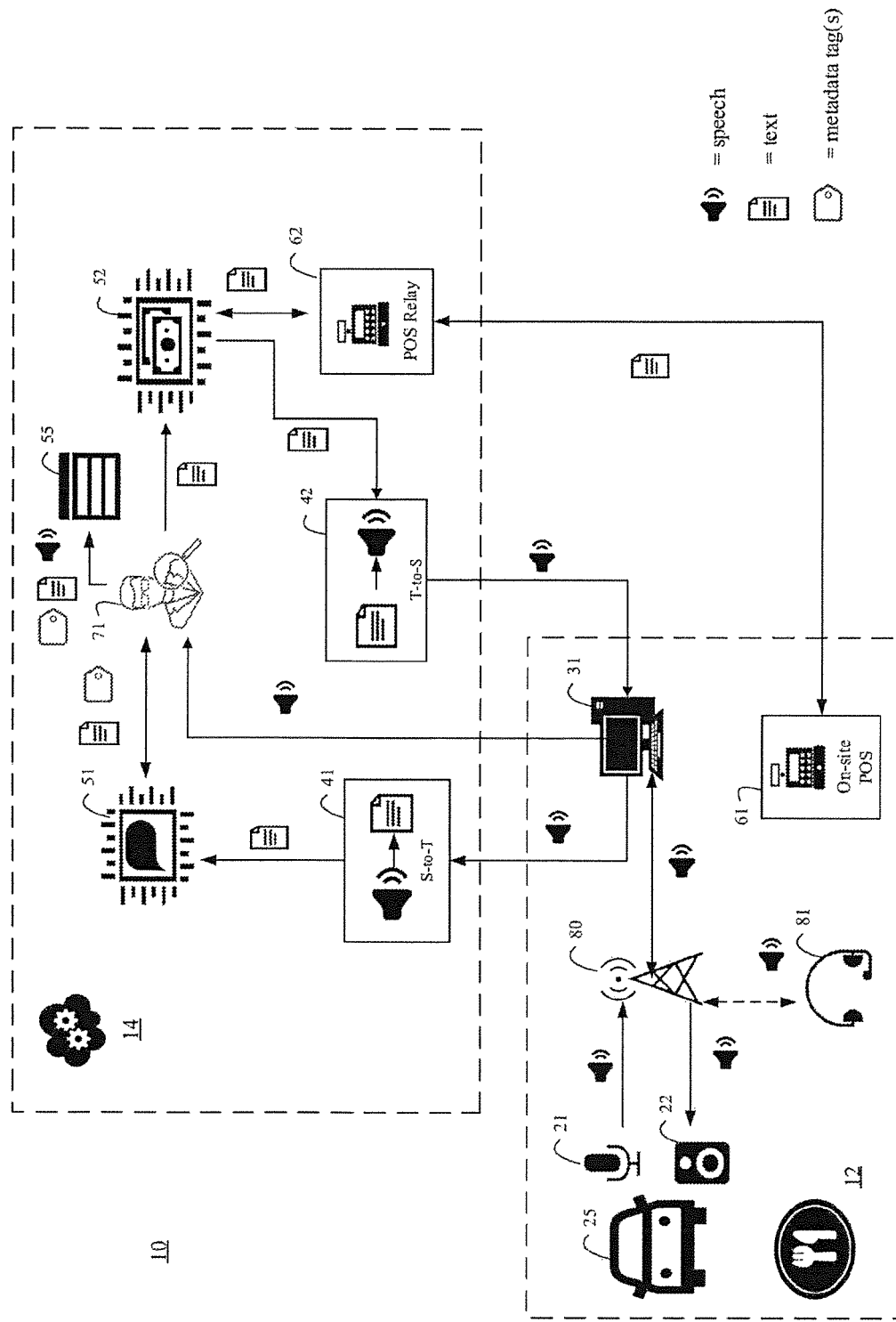
FIG. 3 is a diagram depicting an artificially intelligent order processing system configured to process orders under auditor review.

FIG. 3 is a diagram depicting the components and the flow of data in an order processing system 10 according to additional aspects of the invention. In the artificially intelligent order processing system according to FIG. 3 an auditor 71 is added to the artificially intelligent order processing system to ensure the fidelity of the order process and recognition of speech by the artificially intelligent order processing system 10. The artificially intelligent order processing system depicted in FIG. 3 also shows the artificially intelligent order processing system 10 taking over the order processing function from the on-site employee 81.

As in the training example in FIG. 2, in the artificially intelligent order processing system depicted in FIG. 3 the audio stream that starts at the order station microphone 21 is transmitted to the base station 80 and then the on-site computer 31. If the computer 31 is switched "off" then the audio stream will be transmitted only to the on-site restaurant base station. If the computer 31 is switched "on" then the audio stream will both be (1) transmitted to the on-site restaurant base station and (2) transmitted to the cloud 14. It is contemplated that the artificially intelligent order processing system 10 can be switched on or off remotely or at the on-site location depending upon the needs of the business and the artificially intelligent order processing system performing the training. The on-site employee 81 in an embodiment is still be responsible for taking payment, and delivering food to a customer 25, although these functions are not depicted in FIG. 3.

Following transmission to the cloud 14, in a configuration of the artificially intelligent order processing system, the first step in processing the audio stream comprises running the audio stream through the trained speech-to-text module 41 created in the training phase, such as in the process presented in FIG. 2. The audio stream from the on-site computer 31 is also optionally transmitted to an auditor 71, who is able to listen to the audio of the order. The speech-to-text converter 41 outputs the transcribed text in its entirety, to a natural language processor (NLP) 51.

In an embodiment, artificially intelligent order processing system further comprises a natural language processor (NLP) 51. The NLP 51 pulls meaning out of the text. In an example, when the text comprises "I want a cheeseburger.", or some similar statement, is sent to the NLP 51, an instruction set adding one cheeseburger to the order is generated, representing the intent of the order. This order, with an order summary in text form (e.g., the order intent—ex. "add one cheeseburger"), is passed to the auditor 71 for comparison with the audio feed that was passed to the auditor 71 from the on-site computer 31. If the order generated by the NLP 51 is correct, then the auditor 71 approves the submitted intent from the NLP 51, then the artificially intelligent order processing system passes the instructions to the business processor 52 and the audio and accompanying order intent is stored in a storage medium 55. If the auditor 71 detects that the artificially intelligent order processing system 10 is not functioning properly, or that the customer 25 is frustrated or otherwise not being adequately served by the artificially intelligent order processing system 10, then the auditor 71 can abort, or intervene in, the transaction and pass control back to the on-site employee 81, such as by sending a notification to the employee 81, including a possible description of the problem or error. The auditor 71 can also remotely switch off the on-site computer 31, to allow on-site employees 81 to take control of order processing.

An embodiment of the artificially intelligent order processing system comprises a business processor 52. The business processor 52 is where business logic operations are performed. For example, if the customer 25 ordered a cheeseburger, the instruction set for the business processor would be to output the text "would you like fries and a drink with that?" The text would be sent to text-to-speech module 42 and then the on-site computer 31, which will output the audio to the base station 80 and then out to the speaker 22. Simultaneously, the business processor will send the original intent of 'add one cheeseburger' to the POS Relay 62, which would send the order down to the onsite point of sale system 61.

An embodiment of the artificially intelligent order processing system is configured to promote sales. An additional feature of the proposed systems is its ability to effectively promote sales in a manner analogous a human cashier. Customers interacting with fast food employees are well-accustomed to the standard up-selling phrase "would you like to make it a combo?" The present inventor has recognized that this particular phrase and variants are used so commonly because it is effective in increasing sales, and thereby is a teaching of an embodiment of the system. The present inventor has further recognized that any new system must be able to provide such promotional features as effectively as a human cashier, and thereby is a teaching of an embodiment of the system. According to an embodiment, the artificially intelligent order processing system is configured to offer additional items that are frequently purchased together or based upon promotions at the business. For example, if the customer orders an item that is also sold as part of a "combo" with additional menu options, the artificially intelligent order processing system could prompt the customer and inform the customer what combos are available for purchase. In addition, by way of example, if bacon or cheese is frequently added to an order, the artificially intelligent order processing system could prompt the customer by asking them if they would like to add that item to their order. In a similar manner, and in conjunction with technology currently available to recognize the identity of a customer and track their preferences with regard to past orders, the artificially intelligent order processing system could query the customer to determine if those past selections should be added to their current order.

Figure 4:
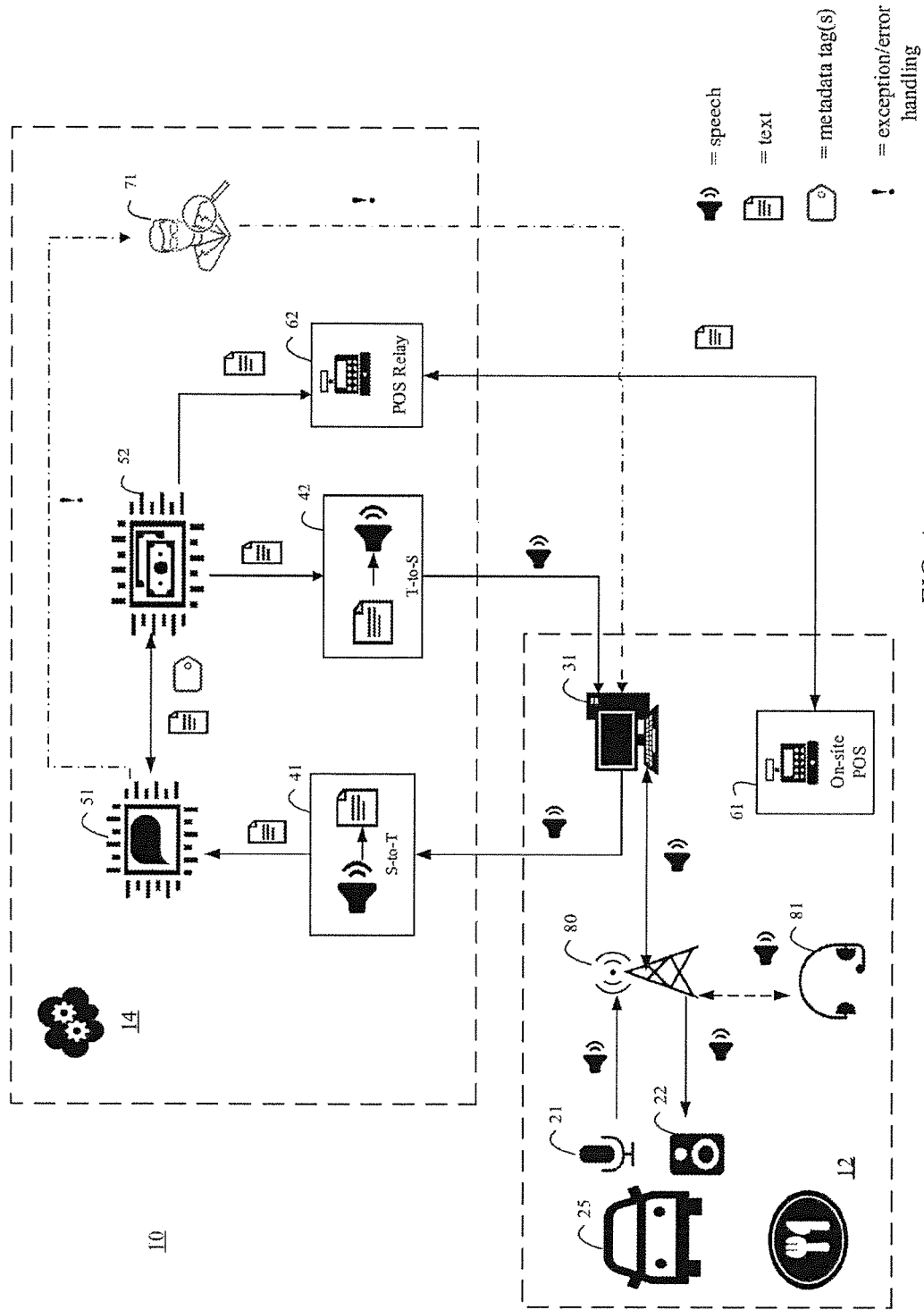
FIG. 4 is a diagram depicting an artificially intelligent order processing system configured to process orders and to operate autonomously with an auditor available for error or exception handling and/or upon the detection of customer frustration or dissatisfaction.
Figure 5:
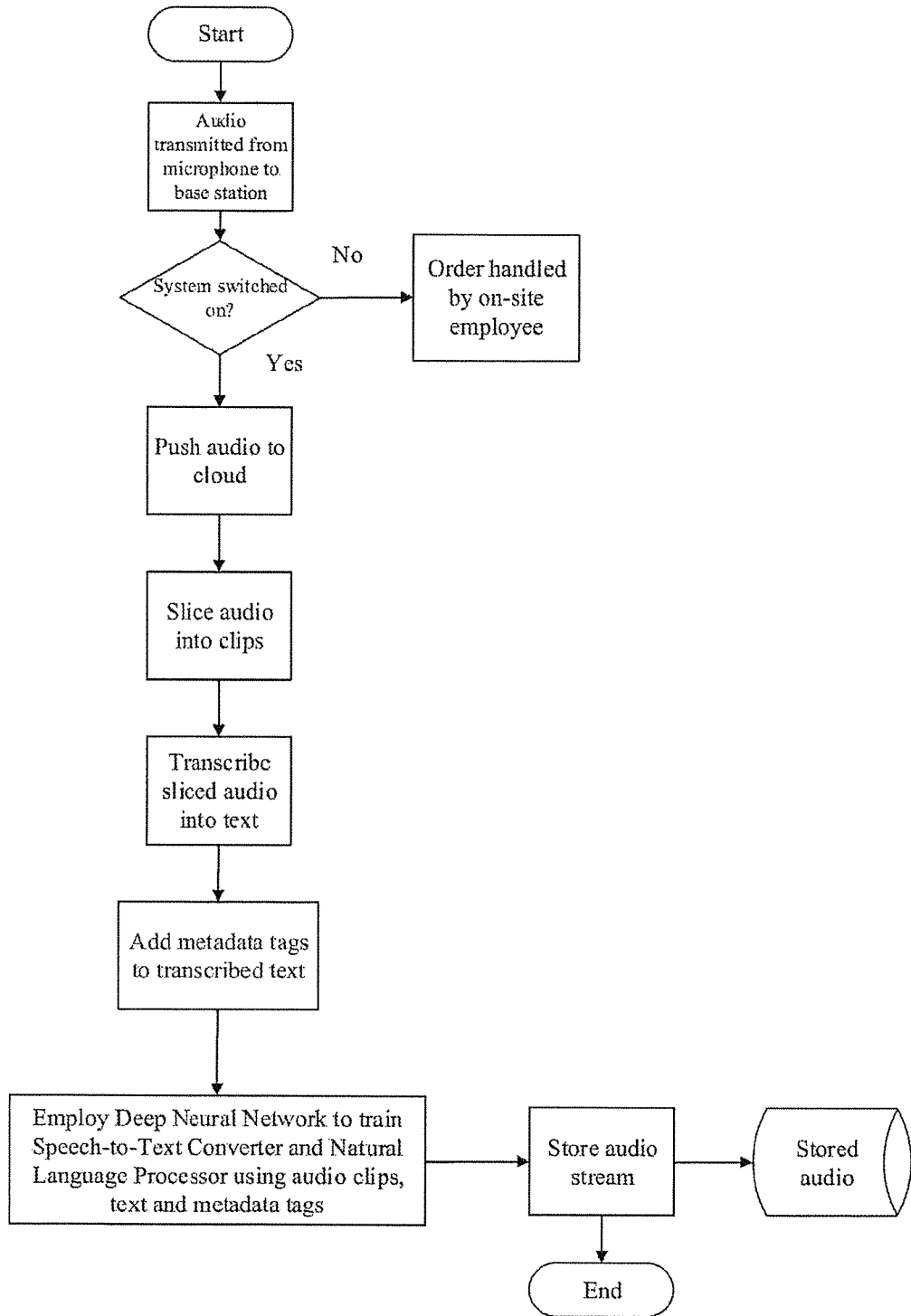
FIG. 5 is a flowchart depicting the training of an artificially intelligent order processing system.
Figure 6:
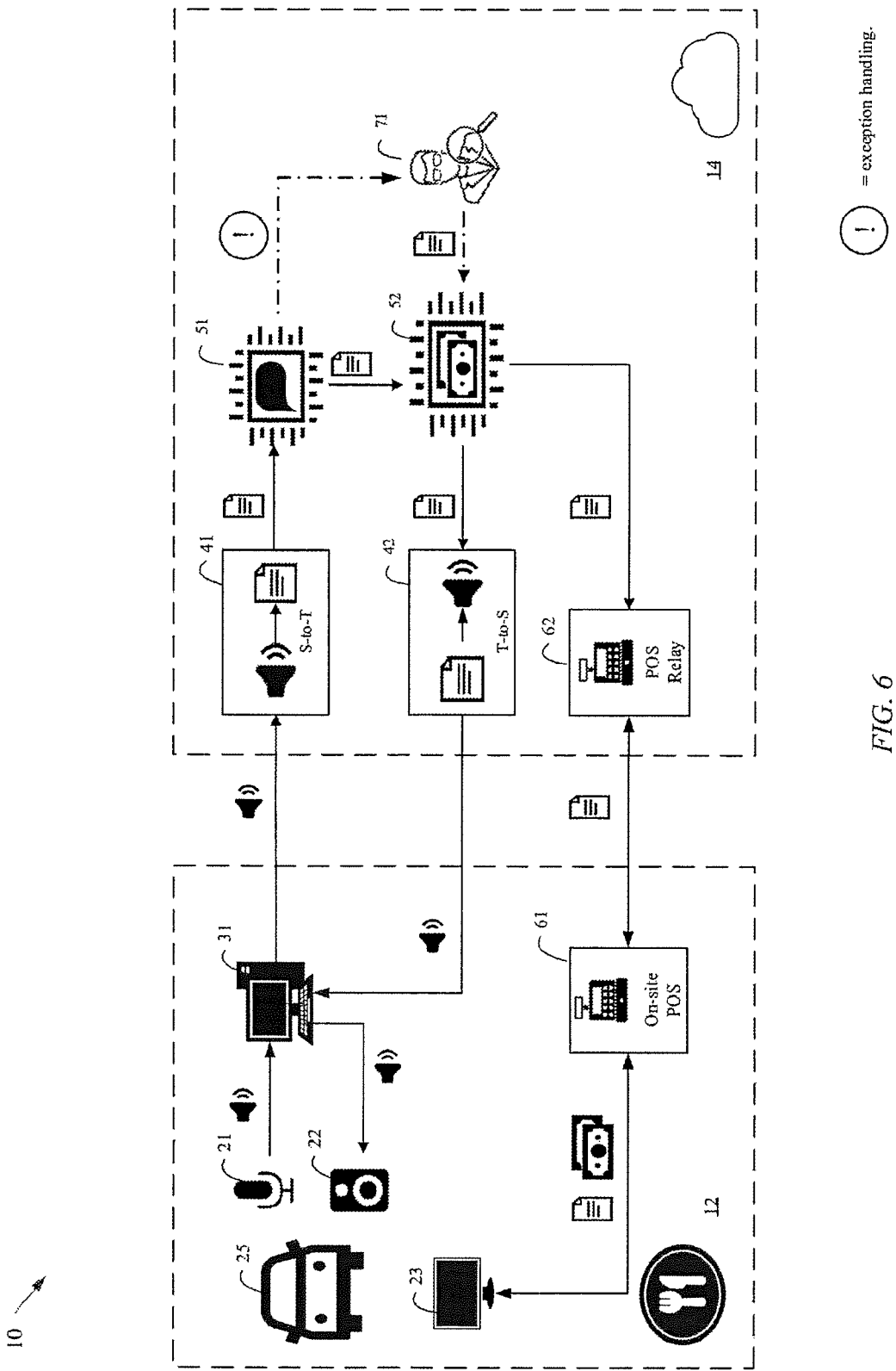
FIG. 6 is a diagram depicting an artificially intelligent order processing system configured to process orders while operating autonomously with an auditor available for error or exception handling and/or upon the detection of customer frustration or dissatisfaction.

FIG. 4 is a diagram depicting the components and the flow of data in an order processing system 10 according to additional aspects of an embodiment. In the artificially intelligent order processing system according to FIG. 4 the artificially intelligent order processing system 10 is largely operating autonomously and the auditor is present predominately to provide exception handling when the artificially intelligent order processing system is not functioning properly. In the autonomous mode the artificially intelligent order processing system functions automatically without direct and continuous oversight by an auditor. The artificially intelligent order processing system can employ automatic error detection systems to detect deviations in orders or customer dissatisfaction. Such conditions can result in the artificially intelligent order processing system switching back to an auditor-assist mode or control of the order processing function passing back to the on-site employee.

A point-of-sale commercial transaction processing system 62 based on cloud computing and intelligent analysis, particularly suitable for the fast food industry, constitutes a teaching of an embodiment of the invention. The transaction processing system utilizes an order terminal having an audio speaker, a microphone, and preferably a video display, a computer system in communication with the order terminal and running artificial intelligence routines to process or pre-process verbal requests provided into the microphone of the order terminal, and a human-controlled response system, or auditor, which completes, corrects or verifies requests that cannot be satisfactorily completed by the artificial intelligence routines alone. The auditor is preferably in communication with the order terminal or (and the customer) via a high-speed voice over internet protocol (VoIP) or data connection. The order terminal may further include payment terminals, touch screens, and other hardware and software options to facilitate the receipt of payment by the customer.

Various techniques have been described in detail above with reference to a few example embodiments thereof as illustrated in the accompanying drawings. In the preceding description, numerous specific details are set forth in order to provide a thorough understanding of one or more aspects and/or features described or reference herein. It will be apparent, however, to one skilled in the art, that one or more aspects and/or features described or referenced herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the artificially intelligent order processing system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

All references cited in the present application are incorporated in their entirety herein by reference to the extent not inconsistent herewith.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method comprising:
    uploading a first audio stream to an artificial intelligence order processing system located in a cloud network from a base station, the first audio stream collected from an on-site customer with a microphone;
    processing the first audio stream into a first textual customer order with the artificial intelligence order processing system, the artificial intelligence order processing system trained using an artificial intelligence algorithm that correlates transcribed text and metadata tags of at least one previous customer order;
    detecting, at a natural language processor (NLP) of the artificial intelligence order processing system, a trigger condition in the first textual customer order;
    sending, in response to the detected trigger condition, the first textual customer order and the first audio stream to a computing device located separately from the artificial intelligence order processing system;
    comparing, at the computing device, the first textual customer order to the first audio stream;
    determining, at the computing device, an error between the first textual customer order and the first audio stream based on the comparing;
    bypassing, in response to the determination regarding the first textual customer order, the artificial intelligence order processing system for processing a second audio stream collected by the microphone; and
    processing a second order associated with the second audio stream at an on-site computing device associated with a location of the on-site customer.

2. The method of claim 1, wherein the first audio stream is processed in real time.

3. The method of claim 1, further comprising deactivating the artificial intelligence order processing system in response to the detected trigger condition.

4. The method of claim 1, wherein a business processor connected to the artificial intelligence order processing system receives order information in the first textual customer order and performs the steps of:
    associating order items in the first textual customer order with one or more additional menu items or options associated with the order items; and
    generating an audio query, the audio query comprising the one or more additional menu items or options associated with the order items, wherein the business processor updates the first textual customer order based upon the audio query.

5. The method of claim 4, wherein a text-to-speech processor of the artificial intelligence order processing system converts a query from the business processor into the audio query to be communicated to the on-site customer and processes text to create an audio communication of the query generated by the business processor.

6. The method of claim 4, further comprising:
detecting, at the NLP, an exception detected in the first audio stream; and
overriding the business processor in response to the detected exception.

7. The method of claim 1, further comprising:
detecting a change in customer traffic; and
deactivating the artificial intelligence order processing system in response to a detected change in the customer traffic.

8. The method of claim 1, further comprising:
training, using the first textual customer order and an artificial intelligence program the natural language processor of the artificial intelligence order processing system to improve order analysis of the natural language processor.

9. A system, comprising:
an artificial intelligence order processing system stored in one or more memories and implemented on one or more processors in a cloud network, the artificial intelligence order processing system trained using an artificial intelligence algorithm that correlates transcribed text and metadata tags of at least one previous customer order, and the artificial intelligence order processing system configured to:
receive a first audio stream from a base station, the first audio stream collected from an on-site customer with a microphone;
process the first audio stream into a first textual customer order;
detect, at a natural language processor (NLP) of the artificial intelligence order processing system, a trigger condition in the first textual customer order; and
send, in response to the detected trigger condition, the first textual customer order and the first audio stream to a computer device located separately from the artificial intelligence order processing system;
the computer device configured to:
compare the first textual customer order to the first audio stream;
determine an error between the first textual customer order and the first audio stream based on the comparing; and
generate a signal to bypass, in response to the determination regarding the first textual customer order, the artificial intelligence order processing system for processing a second audio stream collected by the microphone; and
an on-site computing device associated with a location of the on-site customer and configured to process a second order associated with the second audio stream.

10. The system of claim 9, wherein the first audio stream is processed in real time.

11. The system of claim 9, wherein the NLP is further configured to deactivate the artificial intelligence order processing system in response to the detected trigger condition.

12. The system of claim 9, further comprising:
a business processor connected to the artificial intelligence order processing system and configured to:
receive order information in the first textual customer order;
associate order items in the first textual customer order with one or more additional menu items or options associated with the order items; and
generate an audio query, the audio query comprising the one or more additional menu items or options associated with the order items, wherein the business processor updates the first textual customer order based upon the audio query.

13. The system of claim 12, further comprising a text-to-speech processor of the artificial intelligence order processing system, the text-to-speech processor configured to:
convert a query from the business processor into the audio query to be communicated to the on-site customer and processes text to create an audio communication of the query generated by the business processor.

14. The system of claim 12, wherein the NLP is further configured to:
detect an exception in the first audio stream; and
override the business processor in response to the detected exception.

15. The system of claim 9, wherein the computer device is further configured to:
detect a change in customer traffic; and
deactivate the artificial intelligence order processing system in response to the detected change in the customer traffic.

16. The system of claim 9, further comprising an artificial intelligence program configured to:
train, using the first textual customer order, the natural language processor of the artificial intelligence order processing system to improve order analysis of the natural language processor.

17. A non-transitory computer readable medium storing instructions thereon, that when executed by a processor cause a processor to perform operations, the operations comprising:
uploading a first audio stream to an artificial intelligence order processing system located in a cloud network from a base station, the first audio stream collected from an on-site customer with a microphone;
processing the first audio stream into a first textual customer order with the artificial intelligence order processing system, the artificial intelligence order processing system trained using an artificial intelligence algorithm that correlates transcribed text and metadata tags of at least one previous customer order;
detecting, at a natural language processor (NLP) of the artificial intelligence order processing system, a trigger condition in the first textual customer order;
sending, in response to the detected trigger condition, the first textual customer order and the first audio stream to a computer device located separately from the artificial intelligence order processing system;
comparing, at the computer device, the first textual customer order to the first audio stream;
determining, at the computer device, an error between the first textual customer order and the first audio stream based on the comparing;
bypassing, in response to the determination regarding the first textual customer order, the artificial intelligence order processing system for processing a second audio stream collected by the microphone; and
processing a second order associated with the second audio stream at an on-site computing device associated with a location of the on-site customer.

18. The non-transitory computer readable medium of claim 17, wherein the first audio stream is processed in real time.

19. The non-transitory computer readable medium of claim 17, wherein the operations further comprise:
   deactivating the artificial intelligence order processing system in response to the detected trigger condition.

20. The non-transitory computer readable medium of claim 17, wherein the operations further comprise:
   receiving order information in the first textual customer order at a business processor connected to the artificial intelligence order processing system;
   associating order items in the first textual customer order with one or more additional menu items or options associated with the order items; and
   generating an audio query, the audio query comprising the one or more additional menu items or options associated with the order items, wherein the business processor updates the first textual customer order based upon the audio query.

* * * * *